United States Patent
Smetana

(10) Patent No.: US 9,302,580 B2
(45) Date of Patent: Apr. 5, 2016

(54) DRIVE DEVICE FOR A VEHICLE

(71) Applicant: Schaeffler Technologies GmbH & Co. KG, Herzogenaurach (DE)

(72) Inventor: Tomas Smetana, Herzogenaurach (DE)

(73) Assignee: Schaeffler Technologies GmbH & Co. KG, Herzogenaurach (DE)

( * ) Notice: Subject to any disclaimer, the term of this patent is extended or adjusted under 35 U.S.C. 154(b) by 0 days.

(21) Appl. No.: 14/389,206

(22) PCT Filed: May 13, 2013

(86) PCT No.: PCT/EP2013/059813
§ 371 (c)(1),
(2) Date: Sep. 29, 2014

(87) PCT Pub. No.: WO2013/178457
PCT Pub. Date: Dec. 5, 2013

(65) Prior Publication Data
US 2015/0057122 A1    Feb. 26, 2015

(30) Foreign Application Priority Data
May 29, 2012    (DE) .......................... 10 2012 208 924

(51) Int. Cl.
*B62D 11/06* (2006.01)
*B60K 17/12* (2006.01)
(Continued)

(52) U.S. Cl.
CPC . *B60K 17/12* (2013.01); *B60K 1/00* (2013.01); *B60K 17/16* (2013.01); *B60L 15/025* (2013.01); *B60L 15/2036* (2013.01); *B60L 15/2054* (2013.01); *F16H 37/065* (2013.01); *F16H 48/36* (2013.01); *B60K 2001/001* (2013.01); *B60L 2220/42* (2013.01); *B60L 2240/421* (2013.01);
(Continued)

(58) Field of Classification Search
None
See application file for complete search history.

(56) References Cited

U.S. PATENT DOCUMENTS 2,408,507 A * 10/1946 Brown ............................... 475/3
2,781,858 A *  2/1957 Kelley et al. ................... 180/6.7
(Continued)

FOREIGN PATENT DOCUMENTS

DE    202012006745 U    8/2012
EP         2386782          11/2011
(Continued)

OTHER PUBLICATIONS

ATZ 113th year, May 2000, pp. 360-365 by Erik Schneider, Frank Fickl, Bernd Cebulski and Jens Liebold, entitled: *Hochintegrativ und Flexibel Elektische Antriebseinheit fuer die E-Fahrzeuge*.

*Primary Examiner* — Dirk Wright
(74) *Attorney, Agent, or Firm* — Davidson, Davidson & Kappel, LLC

(57) ABSTRACT

A drive device for a vehicle is provided having an electric motor for generating a drive torque for the vehicle having a reduction gear section; the reduction gear section being operatively connected to the electric motor and reducing the drive torque; having a power divider section operatively connected to the reduction gear section; the power divider section distributing the reduced drive torque to the two output shafts; the power divider section and the reduction gear section being configured coaxially to a main transmission axis; and the power divider section being configured as a planetary gear set, a planetary drive being associated with each of the output shafts; the planetary gears of the two planetary drives being configured on a common planetary-gear carrier in a common pitch-circle diameter.

5 Claims, 2 Drawing Sheets

(51) Int. Cl.
*F16H 48/36* (2012.01)
*B60K 1/00* (2006.01)
*B60K 17/16* (2006.01)
*F16H 37/06* (2006.01)
*B60L 15/02* (2006.01)
*B60L 15/20* (2006.01)

(52) U.S. Cl.
CPC ...... *B60L 2240/423* (2013.01); *B60L 2240/461* (2013.01); *F16H 2048/364* (2013.01)

(56) References Cited

U.S. PATENT DOCUMENTS

| | | | | |
|---|---|---|---|---|
| 3,351,149 | A * | 11/1967 | Lundin et al. | 180/6.7 |
| 3,371,734 | A * | 3/1968 | Zaunberger et al. | 180/6.44 |
| 3,395,671 | A * | 8/1968 | Zimmerman, Jr. | 440/12.65 |
| 3,450,218 | A * | 6/1969 | Looker | 180/6.44 |
| 4,718,508 | A * | 1/1988 | Tervola | 180/6.44 |
| 4,813,506 | A * | 3/1989 | Smith | 180/6.44 |
| 5,275,248 | A * | 1/1994 | Finch et al. | 180/65.6 |
| 5,722,501 | A * | 3/1998 | Finch et al. | 180/6.44 |
| 6,206,798 | B1 * | 3/2001 | Johnson | 475/6 |
| 6,478,706 | B1 * | 11/2002 | Crabb | 475/18 |
| 6,491,118 | B1 * | 12/2002 | Hou et al. | 180/6.44 |
| 7,074,151 | B2 * | 7/2006 | Thompson | 475/225 |
| 7,360,613 | B2 * | 4/2008 | Hasegawa et al. | 180/6.2 |
| 7,497,796 | B2 * | 3/2009 | Ordo et al. | 475/5 |
| 2014/0080653 | A1 | 3/2014 | Smetana | |
| 2014/0106930 | A1 | 4/2014 | Smetana et al. | |
| 2014/0235394 | A1 | 8/2014 | Smetana et al. | |
| 2015/0151634 | A1 * | 6/2015 | Smetana | 475/150 |

FOREIGN PATENT DOCUMENTS

| | | |
|---|---|---|
| EP | 2469127 | 6/2012 |
| EP | 2511569 | 10/2012 |
| EP | 2511570 | 10/2012 |
| WO | WO2010066532 | 6/2010 |
| WO | WO2011076542 | 6/2011 |
| WO | WO2012139832 | 10/2012 |
| WO | WO2012139833 | 10/2012 |
| WO | WO2013013841 | 1/2013 |
| WO | WO2013041142 | 3/2013 |
| WO | WO2013041145 | 3/2013 |

* cited by examiner

DRIVE DEVICE FOR A VEHICLE

The present invention relates to a drive device for a vehicle having an electric motor for generating a drive torque for the vehicle, having a reduction gear section; the reduction gear section being operatively connected to the electric motor and reducing the drive torque; having a power divider section that is operatively connected to the reduction gear section; the power divider section distributing the reduced drive torque to two output shafts; and the power divider section and the reduction gear section being configured coaxially to a main transmission axis.

BACKGROUND

Electric motors are being increasingly used in vehicles to power the same; a drive torque being either alternatively or additionally used to propel the vehicle. In terms of the number and costs of the components, it has proven to be an advantageous alternative for one single electric motor to be used to drive one axle, and thus two wheels of the vehicle. In contrast to classic combustion engines, electric motors have a different power characteristic, requiring that an intermediate transmission be configured in the drive train in a variant design between the electric motor and the driven wheels.

A detailed description of an electric drive is derived from one article from the periodical ATZ 113th year, May 2000, pp. 360-365 by Erik Schneider, Frank Fickl, Bernd Cebulski and Jens Liebold, entitled: *Highly Integrative and Flexible Electric Drive Unit for Electric Vehicles*. This constitutes the most proximate related art. It describes a drive unit for an axle of a vehicle which includes an electric motor that is configured concentrically and coaxially to a bevel-gear differential; a switchable two-speed planetary gear train, which is likewise positioned coaxially to the electric motor, respectively the bevel-gear differential, being configured in the power train between the electric motor and the bevel-gear differential for purposes of gear reduction.

SUMMARY OF THE INVENTION

It is an object of the present invention to provide a drive device for a vehicle having an electric motor that requires a small number of components and is compact in design.

The present invention provides a drive device for a vehicle. In particular, the vehicle is a passenger car. In modified specific embodiments, it may also be a three-wheeled vehicle, a bus, a truck or a different vehicle having at least one driven axle. It is especially preferred that the drive device be designed as an installation module that may be compactly installed in the vehicle, in particular as a self-retaining assembly.

The drive device includes an electric motor that is designed for generating a drive torque for the vehicle. It is especially preferred that the drive torque be a main drive torque, so that the vehicle is exclusively driven by the drive torque. In particular, the electric motor is dimensioned in a way that makes vehicle speeds greater than 50 km/h, preferably greater than 80 km/h, and, in particular, greater than 100 km/h attainable. It is especially preferred that the electric motor have a power output greater than 30 kW, preferably greater than 50 kW, and, in particular, greater than 70 kW.

The drive device includes a reduction gear section that is operatively connected to the electric motor, so that the drive torque is converted to a reduced drive torque. In particular, the angular velocity and/or the number of revolutions per minute at the input of the reduction gear section is greater than at the output thereof. This primary stage has the advantage that the rotational speed of the typically high-speed electric motor is already reduced, making it possible for the rotational speed to be adjusted to a desired rotational speed of the driven wheels of the vehicle.

The drive device includes a power divider section, the power divider section being operatively connected to the reduction gear section. The power divider section is designed to distribute the reduced drive torque to two output shafts. The output shafts are associated with the wheels of the axle of the vehicle.

It is especially preferred that the output, in particular the rotor shaft of the electric motor be connected to an input of the reduction gear section for co-rotation therewith, and/or that an output of the reduction gear section be connected to an input of the power divider section for co-rotation therewith, and/or that the outputs of the power divider section be connected to the two output shafts for co-rotation therewith. By directly operatively connecting the function modules of the drive device, it is possible to eliminate the need for unnecessary intermediate components and to enhance the compactness of the drive device.

It is provided that at least the power divider section and the reduction gear section be configured coaxially to a main transmission axis and thus coaxially to one another. It is especially preferred that the output shafts be configured coaxially to the input and/or the output of the reduction gear section.

In the context of the present invention, it is provided that the power divider section be configured as a planetary gear set, a planetary drive being associated with each of the output shafts. The planetary drive preferably includes a sun gear, a set of planetary gears, as well as a ring gear, the planetary gears meshing both with the sun gear, as well as with the ring gear. It is also provided that the planetary gears of both planetary drives be configured on a common planetary-gear carrier and in a common pitch-circle diameter. The common planetary-gear carrier forms a, respectively the input for the power divider section. In particular, the common planetary-gear carrier is connected to the output of the power divider section for co-rotation therewith. The planetary-gear carrier may have a single- or multi-part design. It may also be realized symmetrically or also asymmetrically. The pitch-circle diameter of the planetary gears is defined by twice the distance of the rotational axes of the planetary gears from the main transmission axis. Thus, if a concentric circle is drawn around the main transmission axis, then the rotational axes of the planetary gears of the two planetary drives are located on this circle.

This embodiment makes it possible for the planetary-gear carrier to be jointly designed for both planetary drives, thereby economizing on components due to the dual use of the planetary-gear carrier. Moreover, the requisite storage outlay for the planetary-gear carrier is reduced in comparison to that for two separate planetary-gear carriers.

One preferred structural design of the present invention provides that the power divider section feature a plurality of pins that are configured on a common planetary-gear carrier. Each of the pins supports one planetary gear of the two planetary drives, the planetary gears being rotatably mounted on the pins. In this preferred embodiment, the pin is configured as a double pin or—in general terms—as a multiple pin. The number of required components is further reduced by the measure whereby the planetary gears of the two planetary drives are configured in pairs on common pins. Otherwise, a separate pin would be needed for each planetary gear of each planetary drive.

One preferred further embodiment of the present invention provides that the power divider section have two ring gears that are configured independently of one another and/or are rotatable relative to one another, the ring gears each meshing with planetary gears of one of the planetary drives, and each being operatively connected to one of the output shafts and, in particular, coupled thereto for co-rotation therewith. Thus, the ring gears form the outputs of the power divider section, and it is especially preferred that they be rotationally, in particular rigidly connected to the output shafts. The large ring gears make possible a further gear reduction, and the rotational speed is to be further reduced in this manner. In particular, the power divider section is dimensioned in a way that allows the angular velocity and/or the rotational speed at the output shafts to be lower than that at the common planetary-gear carrier.

In one first possible embodiment of the present invention, the power divider section has two sun gears that are each associated with one of the planetary drives and are fixedly mounted in the power divider section, respectively in the drive device. In this simplest embodiment, the two output shafts always assume the same angular velocity and/or the same rotational speed. In particular, the reduced drive torque is uniformly distributed between the two output shafts.

One alternative embodiment of the present invention provides that the sun gears be coupled to one another via a passive compensating mechanism which allows the sun gears to rotate relative to one another. For example, it may be provided that the passive compensating mechanism feature a locking action, the locking rate being greater than 5%, preferably greater than 10%. This embodiment provides that the configuration of the power divider section include the passive compensating mechanism as a compensating or locking differential.

One preferred embodiment of the present invention provides that the sun gears be coupled to one another via an active compensating mechanism. The active compensating mechanism is designed to rotate the sun gears relative to one another and, in this manner, to effect a change in the torque distribution between the output shafts. In particular, the active compensating mechanism is designed to apply an auxiliary torque to the sun gears. In the specific case, the active compensating mechanism is a torque-vectoring device for the vehicle.

One possible structural design provides that the active compensating mechanism feature an auxiliary electric motor, the rotor shaft thereof being coupled to a gear wheel that meshes both with a gear wheel, which is rotationally coupled to the one sun gear in co-rotation therewith, and with a gear wheel, which is coupled to the other gear wheel in co-rotation therewith.

In one possible further structural refinement, the sun gears are coupled to the compensating mechanism via hollow shaft sections that are configured in a bushing region coaxially and concentrically to one of the output shafts, as well as to themselves. For example, one of the sun gears is coupled to a first hollow shaft section; the other of the sun gears to a second hollow shaft section that is configured coaxially and concentrically to the first hollow shaft section, both hollow shaft sections being configured concentrically and coaxially to the output shaft. This embodiment renders possible a very space-saving configuration of the components. One possible realization of the present invention provides that bevel gears, in particular toothed bevel gears, be rotationally mounted as the gear wheels on the free ends of the hollow shaft sections; the auxiliary electric motor being oriented orthogonally to the longitudinal extent of the hollow shaft sections and, via the rotor shaft, driving a bevel gear that meshes with the mounted bevel gears to effect a relative rotation, a torque distribution and/or a rotational speed redistribution between the sun gears.

In one preferred structural design, the reduction gear section is configured in the bushing region. In this embodiment, it is very preferably provided that the reduction gear section be configured between the compensating mechanism, in particular the active compensating mechanism, and the reduction gear section. This embodiment promotes a compact design of the drive device.

In one especially preferred structural embodiment, the electric motor is coaxially configured, in particular coaxially by the rotor shaft thereof, to the main transmission axis. The reduction gear section is configured as a planetary drive and/or includes the same, the rotor shaft of the electric motor being configured as a hollow shaft and being operatively connected to a reduction sun gear of the planetary drive and, in particular, connected thereto for co-rotation therewith. In addition, the planetary drive includes a reduction planetary carrier that is operatively connected to the common planetary carrier, in particular rotationally or rigidly coupled thereto. A reduction ring gear of the planetary drive is fixedly mounted in the drive device. This embodiment preferably provides that the electric motor be configured between the active compensating mechanism and the reduction gear section, thereby providing a coaxially oriented and very compact drive device.

In one especially preferred further refinement of the present invention, the reduction planetary gears of the reduction gear section are mounted on the common pins of the power divider section. In this case, the common pins are configured as triple pins. This embodiment further supports the objective of keeping the number of components for the drive device low. Besides the cost savings, this also leads to a reduction in the weight of the drive device.

In one alternative embodiment of the present invention, the electric motor, in particular the rotor shaft thereof, is disposed in parallel to and offset from the main transmission axis. In this embodiment, the rotor shaft drives the reduction gear section configured as a spur gear stage. This embodiment likewise renders possible a very compact realization of the drive device; the weight, respectively the mass of the drive device being differently distributed, however, as in the other preferred specific embodiment of the present invention.

BRIEF DESCRIPTION OF THE DRAWINGS

Other features, advantages and effects of the present invention are derived from the following description of preferred exemplary embodiments thereof. In the drawing.

DETAILED DESCRIPTION

Figure 1:
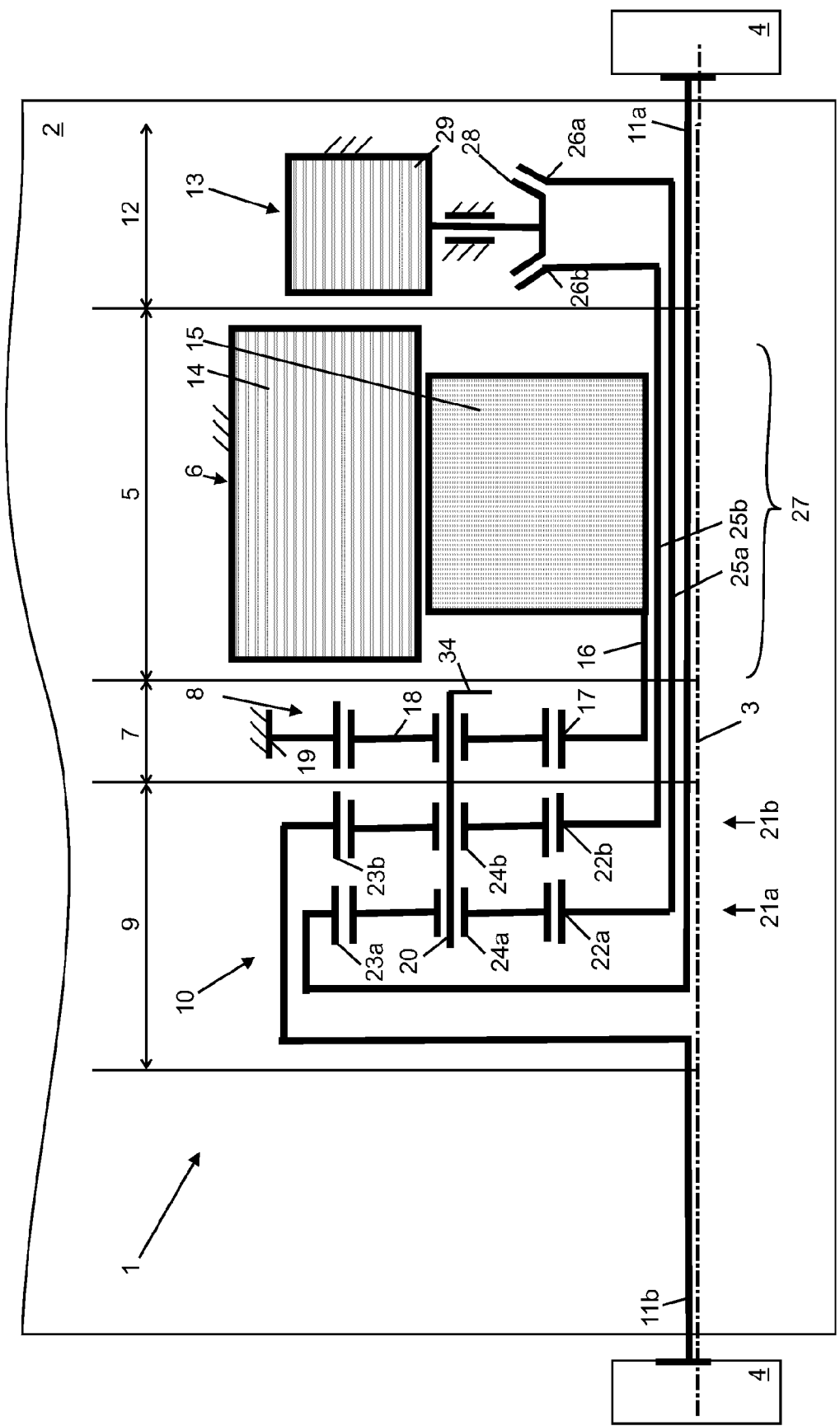
FIG. 1 shows, in a schematic representation, the design of a drive device as a first exemplary embodiment of the present invention.

Equivalent or like parts or components are denoted in each case in both figures by the same reference numerals.

In a highly schematized representation, FIG. 1 shows a drive device 1 for a vehicle 2 as an exemplary embodiment of the present invention. Vehicle 2 is only shown highly schematized. Drive device 1 is used for driving a main transmission axis 3 of vehicle 2 having two wheels 4; drive device 1 being designed for applying a drive torque to wheels 4.

Drive device 1 has four sections; in a first section 5, an electric motor 6 having a stator and a rotor being configured for generating a drive torque for vehicle 2. In a second section 7, a reduction gear section 8 is configured that reduces the drive torque of electric motor 6 and thereby slows the rotational speed. In a third section 9, a power divider section 10 is positioned that is used for distributing the reduced drive torque to two output shafts configured as driven shafts 11a, b; driven shafts 11a, b being coupled to wheels 4 of vehicle 2. In a fourth section 12, an active compensating mechanism 13 is configured that is designed for modifying the torque distribution to driven shafts 11a, b.

Electric motor 6 has a stator 14 and a rotor 15, rotor 15 being coupled to a hollow shaft 16 for co-rotation therewith. Electric motor 6, stator 14, rotor 15 and hollow shaft 16 are configured concentrically and coaxially to main transmission axis 3.

The drive torque generated by electric motor 6 is transmitted to reduction gear section 8. Reduction gear section 8 is configured as a planetary drive and includes a reduction sun gear 17, reduction planetary gears 18 and a reduction ring gear 19. Reduction sun gear 17, reduction planetary gears 18 and reduction ring gear 19 are configured as spur-toothed components. In particular, they are realized as spur gears which bear a coupling structure, such as teeth, on the circumferential periphery thereof. Hollow shaft 16 is directly coupled to reduction sun gear 17 for co-rotation therewith, so that, in operation, they rotate jointly around main transmission axis 3. Reduction ring gear 19 is fixedly mounted in drive device 1. Reduction planetary gears 18 are configured on a peripherally extending pitch circle and mesh both with reduction sun gear 17, as well as with reduction ring gear 19. The pitch circle features a pitch-circle diameter that is defined by the position of the axes of rotation of reduction planetary gears 18 and/or by the position of pins 20 upon which reduction planetary gears 18 are rotatably mounted. Pins 20, respectively a planetary-gear carrier bearing pins 20 form an output of power divider section 8. The rotational speed applied to the input of reduction gear section 8, which is configured as reduction sun gear 17, is greater than that around main transmission axis 3 applied to the carrier (not shown), respectively pins 20.

Power divider section 10 includes two planetary drives 21a, b; each of the two planetary drives 21a, b having a sun gear 22a, b, a ring gear 23a, b, as well as a plurality of planetary gears 24a, b.

Analogously to the planetary drive of reduction gear section 8, planetary gears 23a, b mesh both with sun gear 22a, b associated respectively therewith, as well as with associated ring gear 23a, b. Planetary gears 24a, b are seated on pins 20, so that a reduction planetary gear 18 and, in each case, a planetary gear 24a and a planetary gear 24b are rotatably mounted on each pin 20. In particular, planetary gears 24a, b have the same diameter and/or the same toothing. Reduction planetary gear 18 may also optionally have the same diameter and the same number of teeth. Thus, the common planetary-gear carrier (not shown) for pins 20 constitutes both an output of reduction gear section 8, as well as an input into power divider section 10.

Ring gears 23a, b are configured independently from one another, so that they are able to rotate relative to one another. Ring gear 23a is connected to driven shaft 11a in co-rotation therewith, as is ring gear 23b to driven shaft 11b. Driven shafts 11a, b are configured coaxially to main transmission axis 3. In addition, driven shaft 11a is configured coaxially and concentrically to hollow shaft 16.

In one first possible exemplary embodiment, sun gears 22a, b are fixedly mounted or configured in a stationary installation in drive device 1. In this case, the reduced drive torque of reduction gear section 10 is always uniformly distributed between driven shafts 11a, b.

In the specific embodiment shown here, sun gears 22a, b are rotationally coupled to hollow shaft sections 25a, b that are configured coaxially and concentrically to one another and are enclosed by hollow shaft 16 and surround driven shaft 11a. Hollow shaft sections 25a, b are connected to bevel gears 26a, b for co-rotation therewith. Hollow shaft sections 25a, b extend in a bushing region 27 through electric motor 6. Bevel gears 26a, b mesh with a bevel gear 28 whose axis of rotation is configured orthogonally to main transmission axis 3 and which is driven via an auxiliary electric motor 29. Together, bevel gears 26a, b, bevel gear 28, as well as auxiliary electric motor 29 form active compensating mechanism 13. In response to rotation of bevel gear 28, a torque may be applied during operation via bevel gears 26a, b, hollow shaft sections 25a, b to sun gears 22a, b, and thus to both planetary drives 21a, b.

Drive device 1 illustrated in FIG. 1 makes possible a very compact design; at the same time, only a small number of components being required.

Figure 2:
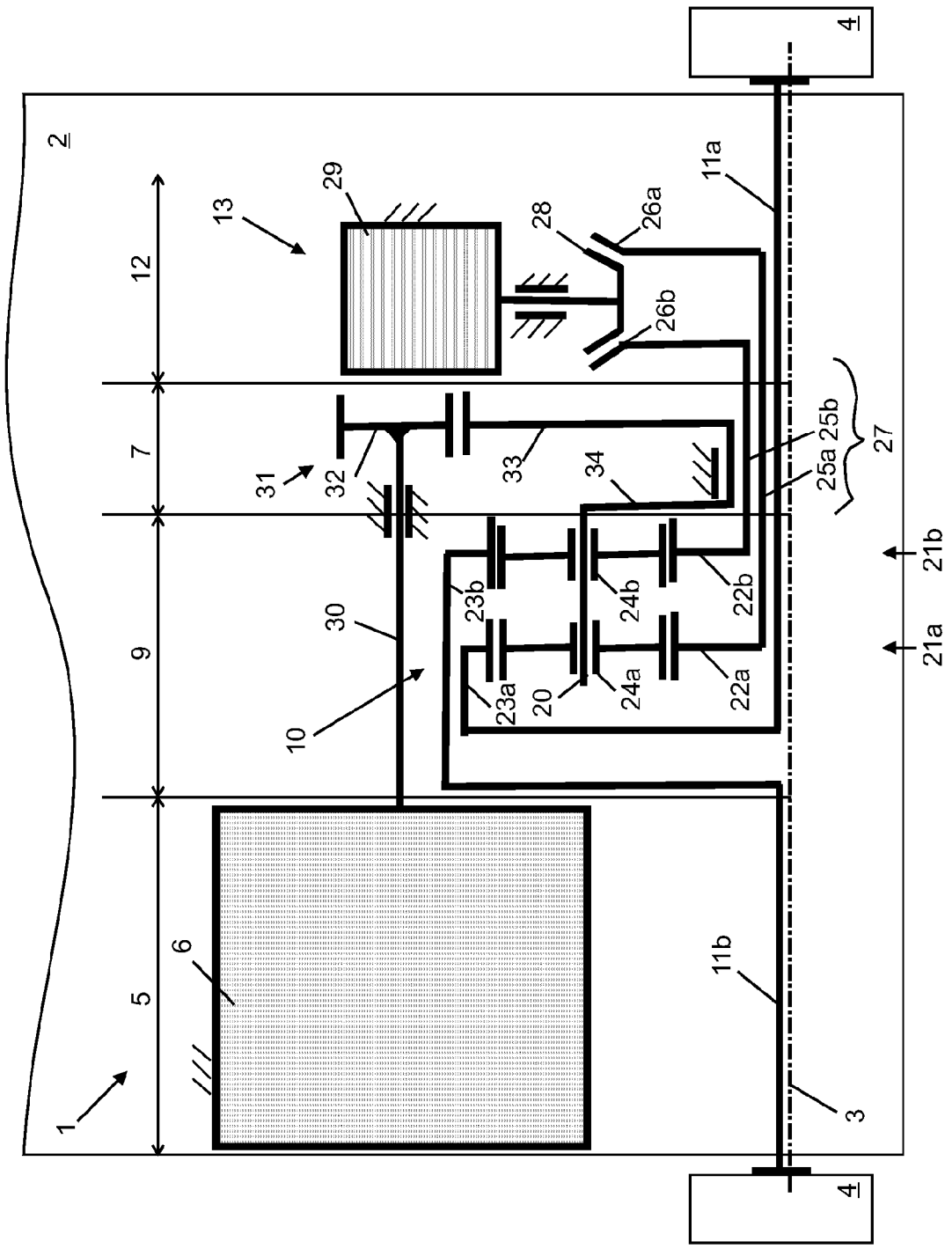
FIG. 2 shows, in the same representation as in FIG. 1, another drive device as a second exemplary embodiment of the present invention.

FIG. 2 shows an alternative specific embodiment of drive device 1; power divider section 10 and active compensating mechanism 13 being configured in correspondence with FIG. 1, so that reference is made to the preceding description. In FIG. 2, however, electric motor 6 is configured with rotor shaft 30 thereof in parallel to main transmission axis 3. In addition, electric motor 6 is positioned on a side of power divider section 10 facing away from active compensating mechanism 13.

The drive torque is applied via rotor shaft 30 to a modified reduction gear section 31, the input being configured as a gear wheel 32 that meshes with a second gear wheel 33 which is configured concentrically and coaxially to main transmission axis 3. Second gear wheel 33 is rotationally connected to a carrier 34 that bears pins 20 of power divider section 10. In this specific embodiment, reduction gear section 31 is configured as a spur gear stage. Considered in terms of function, however, a gear reduction again takes place, however, so that the rotational speed at first gear wheel 31 is always greater than the rotational speed of pins 20, respectively of carrier 34. In this exemplary embodiment of the present invention, pins 20 are configured as double pins that bear planetary gears 24a, b.

LIST OF REFERENCE NUMERALS 1 drive device
2 vehicle
3 main transmission axis
4 wheel
5 first section
6 electric motor
7 second section
8 reduction gear section
9 third section
10 power divider section
11a, b driven shaft
12 fourth section
13 compensating mechanism
14 stator
15 rotor
16 hollow shaft
17 reduction sun gear
18 reduction planetary gear
19 reduction ring gear 20 pin
21a, b planetary drive
22a, b sun gear
23a, b ring gear
24a, b planetary gear
25a, b hollow shaft section
26a, b bevel gear
27 bushing region
28 bevel gear
29 auxiliary electric motor
30 rotor shaft
31 reduction gear section
32 first gear wheel
33 second gear wheel
34 carrier

What is claimed is:

1. A drive device for a vehicle comprising:
an electric motor for generating a drive torque for the vehicle;
a reduction gear section operatively connected to the electric motor and reducing the drive torque;
a power divider section operatively connected to the reduction gear section, the power divider section distributing the reduced drive torque to the two output shafts, the power divider section and the reduction gear section being configured coaxially to a main transmission axis, the power divider section being configured as a planetary gear set, a planetary drive being associated with each of the output shafts, the planetary gears of the two planetary drives being configured on a common planetary-gear carrier in a common pitch-circle diameter wherein the power divider section has a plurality of pins, a planetary gear of the two planetary drives being mounted on the respective pins.

2. A drive device for a vehicle comprising:
an electric motor for generating a drive torque for the vehicle;
a reduction gear section operatively connected to the electric motor and reducing the drive torque;
a power divider section operatively connected to the reduction gear section, the power divider section distributing the reduced drive torque to the two output shafts, the power divider section and the reduction gear section being configured coaxially to a main transmission axis, the power divider section being configured as a planetary gear set, a planetary drive being associated with each of the output shafts, the planetary gears of the two planetary drives being configured on a common planetary-gear carrier in a common pitch-circle diameter,
wherein the power divider section has two sun gears mounted independently of one another, the sun gears each meshing with planetary gears of one of the planetary drives,
wherein the sun gears are coupled to one another via an active compensating mechanism,
wherein the sun gears are coupled to the compensating mechanism via hollow shaft sections configured in a bushing region coaxially and concentrically to one of the output shafts, and wherein the reduction gear section is configured in the bushing region.

3. A drive device for a vehicle comprising:
an electric motor for generating a drive torque for the vehicle;
a reduction gear section operatively connected to the electric motor and reducing the drive torque;
a power divider section operatively connected to the reduction gear section, the power divider section distributing the reduced drive torque to the two output shafts, the power divider section and the reduction gear section being configured coaxially to a main transmission axis, the power divider section being configured as a planetary gear set, a planetary drive being associated with each of the output shafts, the planetary gears of the two planetary drives being configured on a common planetary-gear carrier in a common pitch-circle diameter, wherein the electric motor is configured coaxially to the main transmission axis, and the reduction gear section is configured as a planetary drive; a rotor shaft of the electric motor being configured as a hollow shaft and being operatively connected to a reduction sun gear; and, in addition, a reduction planetary carrier being rotationally coupled to the common planetary-gear carrier or forming a part thereof.

4. The drive device as recited in claim 3 wherein the reduction planetary gears of the reduction gear section are mounted on the pins of the power divider section.

5. A drive device for a vehicle comprising:
an electric motor for generating a drive torque for the vehicle;
a reduction gear section operatively connected to the electric motor and reducing the drive torque;
a power divider section operatively connected to the reduction gear section, the power divider section distributing the reduced drive torque to the two output shafts, the power divider section and the reduction gear section being configured coaxially to a main transmission axis, the power divider section being configured as a planetary gear set, a planetary drive being associated with each of the output shafts, the planetary gears of the two planetary drives being configured on a common planetary-gear carrier in a common pitch-circle diameter, wherein the electric motor is disposed in parallel to and offset from the main transmission axis; a rotor shaft of the electric motor driving the reduction gear section configured as a spur gear stage; a gear wheel of the spur gear stage being rotationally coupled to the common planetary-gear carrier.

* * * * *